Jan. 4, 1966   J. PLANTE   3,227,619
APPARATUS FOR CONTROLLING A NUCLEAR REACTOR BY ABSORBENT
GAS AND DEVICE FOR ITS APPLICATION
Filed Sept. 16, 1963   3 Sheets-Sheet 1

INVENTOR.
JACQUES PLANTE
BY Bacon & Thomas
ATTORNEYS

United States Patent Office 3,227,619
Patented Jan. 4, 1966

3,227,619
APPARATUS FOR CONTROLLING A NUCLEAR REACTOR BY ABSORBENT GAS AND DEVICE FOR ITS APPLICATION
Jacques Plante, La Celle-Saint-Cloud, France, assignor to Commissariat a l'Energie Atomique, Paris, France
Filed Sept. 16, 1963, Ser. No. 309,209
Claims priority, application France, Sept. 26, 1962, 910,458
7 Claims. (Cl. 176—22)

The present invention relates to apparatus for controlling nuclear reactors by variation of pressure of an absorbent gaseous mixture consisting of a neutron-absorbing gas and if necessary an inert gas, said mixture being contained in vessels disposed in the reactor core or in the reflector, as well as to devices which involve the application of said methods.

A known method of control consists in introducing in excess quantity a chemical reagent intended for the purpose of forming a compound which is condensable with the products of irradiation of the absorbent gas in the fluid-circuit, in eliminating said compounds in the form of condensate, and in introducing in the piping system both absorbent gas and reagent with a view to replacing the products which have been eliminated.

The device for controlling the activity of a nuclear reactor involving the application of said method comprises a reservoir-tank which is filled with a mixture consisting of an absorbent fluid ($_2He^3$+inert gas) and a chemical reagent (oxygen), a pressure-reducing valve which connects said tank to a piping system which passes through the reactor core or the reflector, the pressure of said pressure-reducing valve being controlled according to the desired reactivity in the reactor, a pump which reinjects the gaseous mixture into said tank after said mixture has passed through at least one vessel in which there takes place the combination of the mixture of hydrogen and tritium on the one hand and oxygen on the other hand, as well as at least one vessel in which the mixture of light water and tritium-charged water which have been formed is eliminated, and means for introducing into the piping system a mixture of helium ($_2He^3$) and oxygen in stoichiometric proportions so as to replace the quantities of products which have been eliminated.

The present invention is directed to the design of an apparatus for regulating the pressure of the absorbent gaseous mixture in the circulation loop which passes through the reactor core, said apparatus being both simple and permitting of close control in spite of variations in the supply pressure of the complete system while also providing rapid response.

An apparatus in accordance with the present invention comprises a circulation loop in which the gaseous mixture is set in motion by means of a circulating pump, said loop comprising means which impose on said mixture at least a localized pressure drop, a piping system connected downstream of said means supplying that portion of said loop which passes through the reactor core.

The characteristic features of the invention will be more clearly understood from a perusal of the description which follows below in connection with one example of embodiment and one alternative form which are given solely by way of example. Reference is made in the description to the accompanying drawings, in which.

Figure 1:
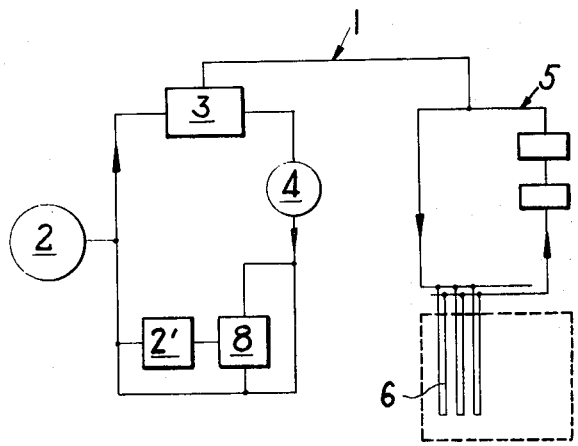
FIG. 1 is a block diagram of the device for controlling a reactor in accordance with the invention.

The device 1 for controlling the reactivity of a nuclear reactor as shown in FIG. 1 comprises a circulation loop constituted by a reservoir-tank 2 referred-to as a "high pressure" tank containing the absorbent liquid ($_2He^3$+inert gas) and the reagent gas (oxygen), a regulating nozzle 3, a pump 4 and ancillary equipment. The loop 5 of the "gaseous rods" consists of "rods" 6 for the control of the reactor which are subjected to the neutron flux in the reactor core.

A reserve of gas 2' makes it possible to introduce into the circulation system a mixture of absorbent gas and reagent gas which is intended to replace the products which have been eliminated during operation.

The mixture of absorbent fluid and reagent gas which circulates in the circulation loop 5 is returned by the pump 4 into the tank 2 through the nozzle 3 after a part of said mixture has passed through a purification system 8 in which there takes place the combination of oxygen with the mixture of hydrogen and tritium under the action of a catalyst (aluminium oxide combined with palladium or with platinum) and the absorption of the light water and the tritium-charged water which are formed, by a silica gel, for example.

Provision can also be made in the loop 5 for circulation and regeneration systems which have not been shown in the drawings since they are not related to the present invention. The pressure-regulating device comprises in particular the nozzle 3.

Figure 3:
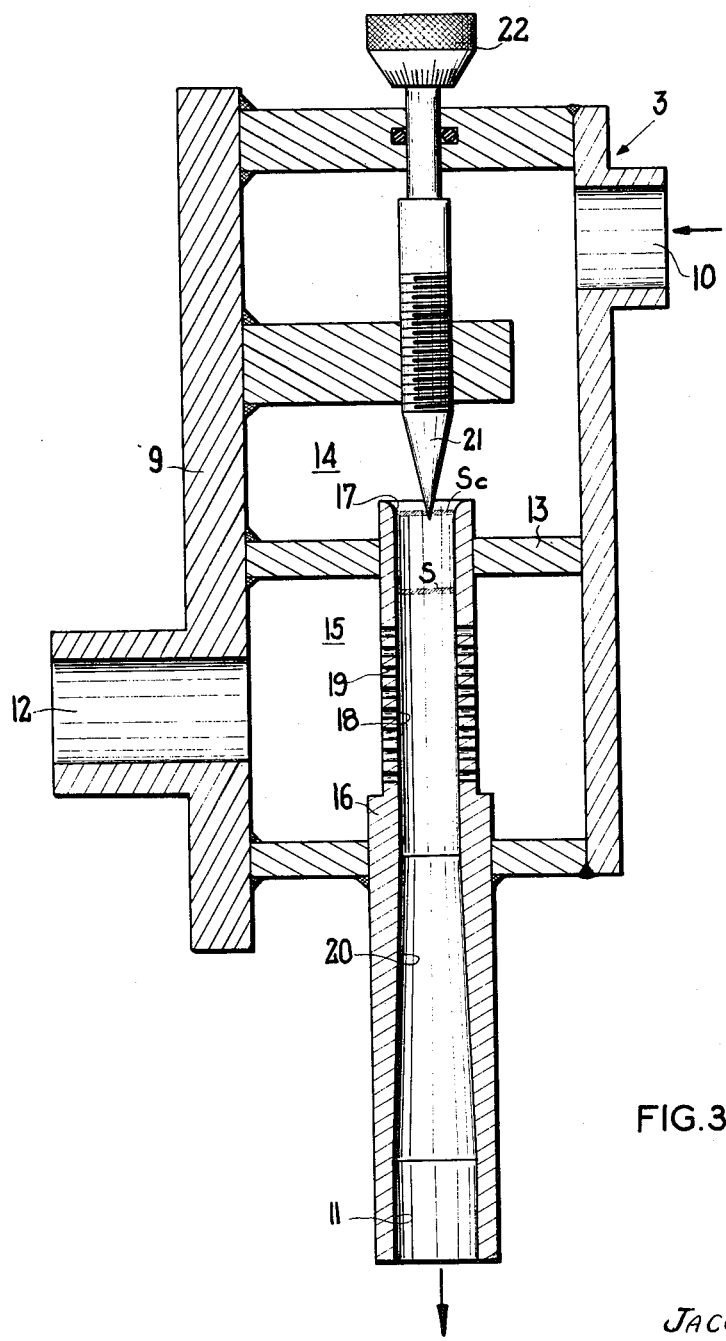
FIG. 3 is a diagrammatic view in diametral cross-section of an expansion nozzle which forms part of the device of FIG. 1.

The nozzle 3 which is illustrated in FIG. 3 comprises a casing 9 which is pierced with an inlet orifice 10, an exhaust orifice 11 and a control orifice 12. The inlet orifice 10 is connected to the tank 2, the pressure of which can vary, for example, between values of the order of atmospheric and 20% of this value, as a result of the fact that the absence of any regulating system is accepted in order to reduce the volume of the loop and accordingly reduces the total expenditure of gas which circulates therein. The exhaust orifice 11 is connected to the medium-vacuum pump 4. Finally, the control orifice 12 is connected to the "rods" 6.

The interior of the casing 9 is separated by a partition wall 13 into two compartments 14 and 15 which are respectively connected to the orifices 10 and 12.

A nozzle body 16 connects the compartment 14 to the exhaust orifice 11. The conduit which is formed in the body 16 comprises from the upstream end to the downstream end a short combining tube 17, a cylindrical bore 18 which communicates through a series of openings such as the opening 19 with the compartment 15 and a progressively diverging delivery-tube 20 having a conicity of the order of 2°, for example.

A needle valve 21 which can be displaced from outside the casing by means of a knurled knob 22, for example, makes it possible to modify the ratio of the cross-section of the bore 18 to the critical cross-section. To this ratio is related the ratio of the input pressure—(which prevails in the compartment 14)—to the pressure existing inside the bore which communicates with the compartment 15 and the control orifice 12. By modification of the position of the needle-valve 21, it is thus possible to modify the pressure within the loop 5 which contains the gaseous "rods" 6 (FIG. 1).

The orifices 19, which have a smaller diameter in order to prevent any possibility of perturbing the flow, can be replaced by clearances formed between partially overlapping strips or any other system of assembly which does not produce a sharp interruption of the wall with a resulting free stream.

Between the inlet 10 and the outlet 11 of the nozzle, there is mantained a pressure ratio which is at least equal to 2/14 in order that the flow in the body 16 should always be distinctly supersonic: this characteristic feature offers among other advantages those of ensuring a short response time and consequently close operational control and the possibility of obtaining a variation in pressure inside the nozzle in a ratio of 1 to 20.

Moreover, one essential advantage of this system lies in its simplicity, inasmuch as it is merely necessary to produce action on the needle-valve 21 in order to adjust the pressure in the rods to the desired value.

Figure 2:
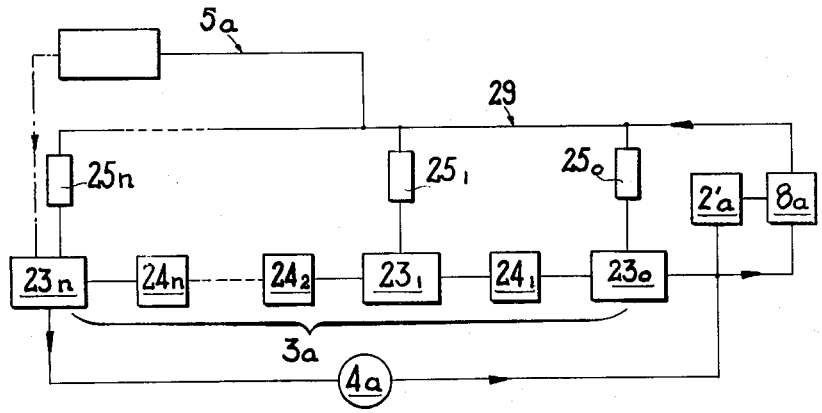
FIG. 2 is a block diagram of an alternative form of the device of FIG. 1.

The control device as represented in FIG. 2 differs essentially from that of FIG. 1 in that it does not employ a nozzle as a control device but a series of pressure drop elements placed in cascade wherein the "rods" can be connected at different points of the series. Those elements of FIG. 2 which are similar to the elements represented in FIG. 1 are designated by the same reference numeral to which has been assigned the index $a$.

FIG. 2 shows diagrammatically the main circulation system comprising a chain of pressure drop elements which is generally designated by the reference numeral $3a$, and a pump $4a$ which causes the gases to circulate in a closed cycle in said chain. Said main circulation system comprises a purification and renewal loop consisting of a gas reserve $2'a$ and a purification system $8a$.

The regulation of pressure in the circulation system of the rods $5a$ is carried out by selection of the point of junction between the rod system and the chain of pressure drop elements $3a$. In FIG. 2, the chain $3a$ is represented as comprising a series of tanks $23_0$, $23_1$, . . . $23n$ which are separated from each other by pressure drop elements $24_1$, $24_2$, . . . $24n$. It is wholly apparent that this non-continuous system could be replaced in certain cases by a single tube having a sufficiently high pressure drop coefficient to ensure that the pressure varies from the upstream end thereof which corresponds to the tank $23_0$ to the downstream end thereof which corresponds to the tank $23n$ by an amount which corresponds to the difference between maximum pressure and minimum pressure which it is desired to provide in the circuit $5a$ of the control "rods."

Depending on the rate of flow which is contemplated, the pressure drop elements can be formed by filter elements or simply by calibrated orifices, nozzles, etc.

The chain of pressure drop elements $3a$ is designed to provide a constant gradation of the pressure from the upstream end to the downstream end or, more exactly, a constant fractionation of the difference in pressure between the upstream end and downstream end which is to a certain extent independent of the flow which is absorbed by the rods.

The connection between the system $5a$ of gaseous rods and one of the tanks $23_0$ to $23n$ is ensured, for example by means of a series of electro-valves $25_0$, $25_1$ . . . $25n$ (as shown in FIG. 3). Said electro-valves do not require to be strictly leak-tight. In fact, if a leak of small value flows towards the circulation system $5a$, it returns to the chain $3a$ at the point where the rod is connected thereto by means of an open electro-valve, without substantially modifying the pressure in system $5a$. Accordingly, the electro-valves can be endowed with a simple and sturdy design such as that which is exemplified in FIG. 4.

Figure 4:
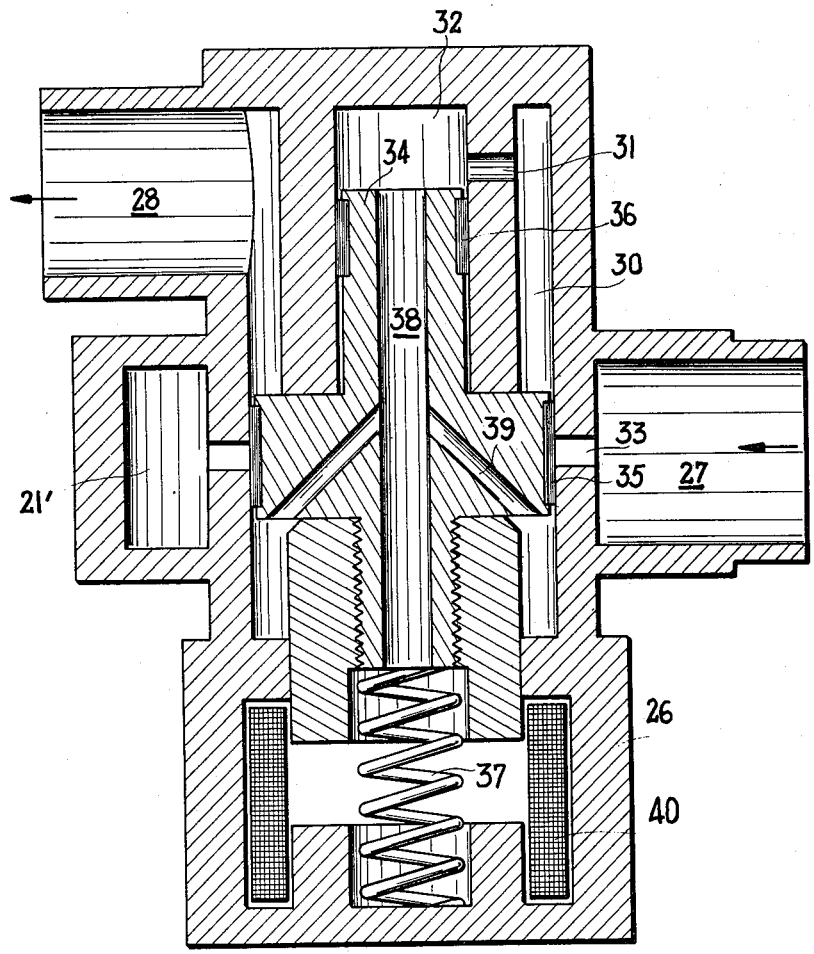
FIG. 4 is a diagrammatic view in diametral cross-section of an electro-valve which forms part of the device of FIG. 2.

The electro-valve which is illustrated in FIG. 4 comprises a casing 26 which is pierced with an intake orifice 27 and an exhaust orifice 28. The intake orifice 27 is connected to a tank 23. The exhaust orifice 28 is connected to the feed header 29 (shown in FIG. 2) of the system $5a$ of gaseous rods.

Internal partition walls form in the interior of the casing 26 a compartment 30 which is connected by means of a bore 31 to a central chamber 32 and by means of a circular slot 33 to an annular chamber 21' in which is formed the intake orifice 27. The compartment 30 opens directly into the exhaust orifice 28.

A valve body 34 composed of a number of components assembled together is adapted to slide inside the central chamber 32 of the casing 26. Said valve body has a bottom portion of magnetic material and is fitted with two slidable sealing members 35 and 36 which are adapted to slide respectively along the walls of compartment 30 and of chamber 32. A spring 37 thrusts back the valve body towards a first abutment position (as shown in FIG. 4) in which the sealing member 35 closes off the bore 35 and therefore separates the compartment 30 from the intake orifice. The pressure which prevails at the exhaust orifice 28 is communicated through the passageway 31, the compartment 32 and the internal passageways 38 and 39 of the valve body to the two extremities of said valve body which is thus subjected to balanced pressure forces. A winding 40 carried by the casing which thus forms a yoke faces opposite the bottom portion of soft iron, for example, of the valve body; when said winding is energized, it exerts on the valve body an attractive force which causes this latter to move in opposition to the action of spring 37 into a position in which the sealing member 35 frees the circular slot 33 and accordingly provides communication with the exhaust orifice 28. The pressure forces exerted on the valve body continue to be balanced.

The tanks $23_0$ to $23n$ and above all the high-pressure tank $2'a$ serve only to absorb variation in the mass of gas in the main circulation loop when the pressure is modified in the "rods." It would of course be possible, at the price of a loss in the response time, to allow only the tank $23_0$ to remain by branching directly each electro-valve on the downstream side of one of the pressure drop elements.

An alternative form of the system described which has not been illustrated in the drawings consists in opening simultaneously two or a number of electro-valves by making provision between each of these latter and the feed header 29 for suitable pressure drop elements. This solution obviously dictates the need for a continuous circulation in the loops 29 and $5a$ with return of this latter to the tank $23n$ through the conduit which is shown in chain-dotted lines. The simultaneous opening of two or a number of electro-valves makes it possible to obtain a more progressive gradation of pressures in the "rods."

The system which has just been described has the advantage of permitting an extremely short response time as a result of the fact that a tank is put directly into communication with the gaseous "rods" through pipes which can be of large section. Furthermore, the system has substantial mechanical strength since it does not present any problem of leak-tightness of the electro-valves. On the other hand, it is wholly obvious that the pressure in the rods can be varied only step by step, but the step-by-step method of operation has been adopted in certain reactors in which no corresponding disadvantage has been noted.

The invention is obviously not limited to the forms of embodiment hereinbefore described and it will be understood that any device which is equivalent to those described must be considered as coming within the scope thereof.

What I claim is:

1. Apparatus for controlling the activity of a nuclear reactor by regulating the degree of pressure of an absorbent gaseous mixture filling a loop disposed in the core of the reactor, comprising: a closed circulation system filled with said absorbent gaseous mixture under pressure; means connected with said system for supplying said gaseous mixture to said system under high pressure; circulating pump means connected with said circulation system for circulating said absorbent gaseous mixture through said system; at least one pressure reducing, mechanical element having a high pressure inlet and low pressure outlet means connected in said circulation system for regulating the degree of pressure of said absorbent gaseous mixture in said circulation system downstream of said element; said high pressure inlet of said pressure reducing element being in direct communication with said high pressure supply; said low pressure outlet means including first and second outlets, said first outlet being connected to said circulation system; a closed circulation loop disposed in the core of said reactor; and means connecting said circulation loop and said second outlet of said pressure reducing element for filling said circulation loop with said absorbent gaseous mixture at a regulated pressure.

2. Apparatus as defined in claim 1 in which said pressure reducing, mechanical element is manually controllable from the outside of said system for regulating the degree of pressure of said absorbent gaseous mixture filling said circulation loop.

3. Apparatus as claimed in claim 1 in which said pressure reducing, mechanical element includes a combining and delivery nozzle fitted with regulating means which make it possible to modify the cross-sectional area at the throat of said nozzle, said nozzle being provided with a lateral wall which is pierced with orifices so distributed that the stream of fluid flowing in said nozzle is not in any portion free from said wall, said orifices opening into a chamber which is connected to the circulation loop which passes through the reactor core.

4. Apparatus for controlling the activity of a nuclear reactor by regulating the degree of pressure of an absorbent gaseous mixture, filling a loop disposed in the core of the reactor, comprising: a closed circulation system filled with said absorbent gaseous mixture under pressure; means connected with said system for supplying said gaseous mixture to said system under high pressure; circulating pump means connected with said circulation system for circulating said absorbent gaseous mixture through said system; a chain of pressure reducing, mechanical elements arranged in series in said closed circulation system for regulating the pressure of said absorbent gaseous mixture downstream of each of said elements; a closed circulation loop disposed in the core of said reactor; and a normally closed device connecting said circulation loop and said circulation system downstream of each of said pressure reducing elements, each of said normally closed devices being individually actuable to the open position for filling said circulation loop with said absorbent gaseous mixture at a selected, regulated pressure.

5. Apparatus as claimed in claim 4 in which said chain of elements is constituted by a series of single-step pressure-drop units, two successive units being separated from each other by a tank to which is connected one of said normally closed devices.

6. Apparatus as claimed in claim 5, in which each of the normally closed devices is an electro-valve, the intake orifice of which is connected to the respective tank and communicates with an annular chamber formed in its casing, said chamber being joined by means of an annular slot to an annular conduit, the exhaust orifice of said electro-valve being connected to the circulation loop, and a valve body displaceable in said electro-valve a communication between the exhaust orifice and the intake orifice being either established or cut-off as a result of the displacements of said valve body.

7. Apparatus for controlling the activity of a nuclear reactor by regulating the degree of pressure of an absorbent gaseous mixture filling a loop disposed in the core of the reactor, comprising: a closed circulation system filled with said absorbent gaseous mixture under pressure; means connected with said system for supplying said gaseous mixture to said system under high pressure circulating pump means connected with said circulation system for circulating said absorbent gaseous mixture through said system; a pressure reducing control device having an inlet and outlet means connected in said circulation system for regulating the degree of pressure of said absorbent gaseous mixture in said circulation system downstream of said device; said inlet of said pressure reducing element being in direct communication with said high pressure supply; said outlet means including first and second outlets, said first outlet being connected to said circulation system, a closed circulation loop disposed in the core of said reactor; and pipe means connecting said circulation loop and said second outlet of said pressure reducing control device for conducting said absorbent gaseous mixture at a regulated pressure from said circulation system to said circulation loop.

References Cited by the Examiner

UNITED STATES PATENTS

| 2,979,450 | 4/1961 | Dusbabek | 176—22 |
|---|---|---|---|
| 3,025,228 | 3/1962 | Whitelow | 176—22 |

FOREIGN PATENTS

| 1,158,320 | 6/1958 | France. |
| 897,889 | 5/1962 | Great Britain. |

REUBEN EPSTEIN, *Primary Examiner.*

CARL D. QUARFORTH, *Examiner.*

M. R. DINNIN, *Assistant Examiner.*